(12) United States Patent
Deshmukh

(10) Patent No.: US 8,601,017 B2
(45) Date of Patent: Dec. 3, 2013

(54) SERVING RELIABLE CONTENT THROUGH SEARCH

(75) Inventor: Chetan Subhash Deshmukh, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 116 days.

(21) Appl. No.: 12/977,130

(22) Filed: Dec. 23, 2010

(65) Prior Publication Data

US 2012/0166482 A1    Jun. 28, 2012

(51) Int. Cl.
*G06F 17/30* (2006.01)
(52) U.S. Cl.
USPC .......................................... 707/765; 707/766
(58) Field of Classification Search
None
See application file for complete search history.

(56) References Cited

U.S. PATENT DOCUMENTS

| 8,024,328 | B2* | 9/2011 | Dolin et al. | 707/723 |
| 2008/0301190 | A1* | 12/2008 | Lockhart et al. | 707/104.1 |
| 2009/0164929 | A1* | 6/2009 | Chen et al. | 715/769 |
| 2012/0066202 | A1* | 3/2012 | Hatazawa et al. | 707/710 |

* cited by examiner

*Primary Examiner* — Hung Q Pham
(74) *Attorney, Agent, or Firm* — Buchenhorner Patent Law

(57) ABSTRACT

A system and method for serving reliable content in search, the method comprising: receiving at a server computer from a user, a request to search a network for certain information; searching the network for the information requested and obtaining a set of results including user-generated content; searching the user's list of social connections; determining whether any of the search results related to a person in the user's list of social connections/contacts; and providing an indication of greater reliability for the search results that correspond to persons from the user's list of social connections.

20 Claims, 5 Drawing Sheets

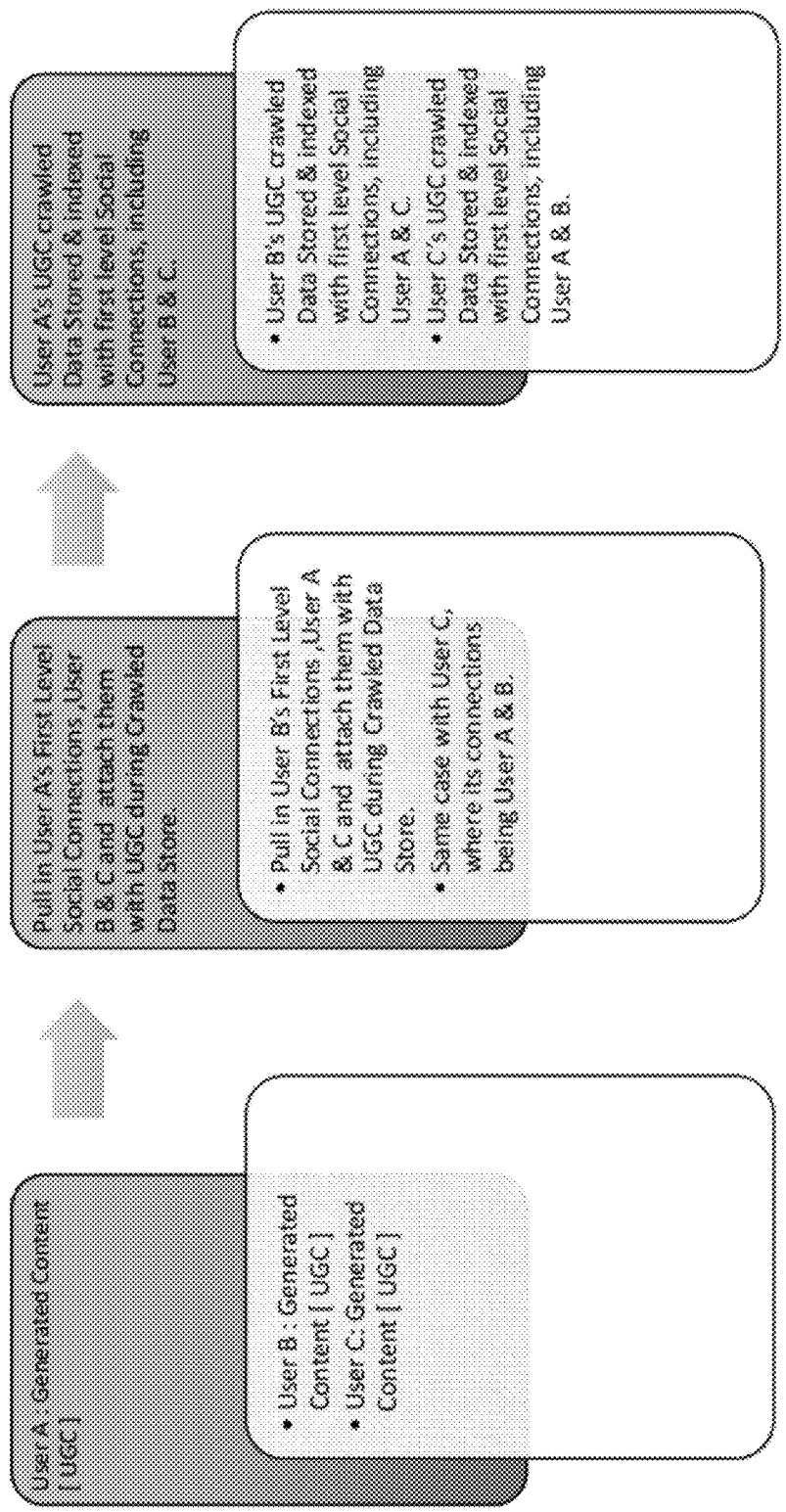
FIG 3 IMPLEMENTATION DETAILS

- User C had already written a blog on CWG Opening ceremony in a Yahoo! website & same data is already crawled, stored with first level connections including User A & User B and indexed with same info.
- User A search query will result in User C UGC contribution. Search engine can check if User A is stored as connections in UGC from User C & if yes, same UGC can be top-served in search results.
- User A finds it interesting & starts interacting with User A on same Yahoo! Website where User C had contributed. More Interest & Content generation is driven out of this experience in Yahoo!.

User A: Searched for CWG opening ceremony in India

- User A loved all Matrix movies & wrote a big & detailed review on all the 3 movies. He loved each & every aspect of these movies & kept adding images, video clips as and when he got hold of them.
- User B wanted to watch Cult Hollywood movies of all time & some one suggested him Matrix trilogy. He searched for Matrix movie review & got to know about User A's blog & found it very interesting & got to know new face of User A. User B got in touch with User A & rest is history ? Both shares the same fascination for Matrix now.

User B: Searched for Review for Movie Trilogy: Matrix

- User B bought a flat from a well marketed real estate builder with high expectations.Unfortunately his experience turns out to be bad , flat handover date was extended thrice, bad build quality & lesser carpet area than promised. He lodged a court case against builder & still not concluded.
- User B blogged his experience as review for the Builder & rated him in negative.
- User C searched for Real Estate builders in Bangalore & got to know about User B's experience. He got in touch with him & learned much more about new cases against same builder,lodged after first blogged by User B. User C learnt & avoided that builder & educated more people in his network.

User C: Searched for Real Estate Developers in Bangalore

FIG. 4

SERVING RELIABLE CONTENT THROUGH SEARCH

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of Internet search, and more particularly relates to the field of serving reliable content through search.

BACKGROUND OF THE INVENTION

Search engines today are intelligent enough to serve us 'relevant' content. But reliable content is not generally available, especially when it is contributed by a regular Internet user or citizen ("netizen"). Content from websites of governments, corporations, markets, and the like are reliable because they are governed by some rules and regulations. But UGC (user generated content) contributed by a netizen is not always reliable.

SUMMARY OF THE INVENTION

Briefly, according to an embodiment of the invention a method includes steps or acts of mining a user's list of social contacts and providing content generated by persons in the list of social contacts.

According to another embodiment, a system for serving reliable content in search includes: a server computer receiving from a user, a request to search a network for requested information; searching the network for the information requested and obtaining a set of results including user-generated content; searching the user's list of social contacts; determining whether any of the search results was from a person in the user's list of social contacts; and providing an indication of greater reliability for the search results that correspond to persons from the user's list of social contacts.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 3 is a simplified block diagram of implementation details.

FIG. 4 is an exemplary listing of use cases.

Figure 1:
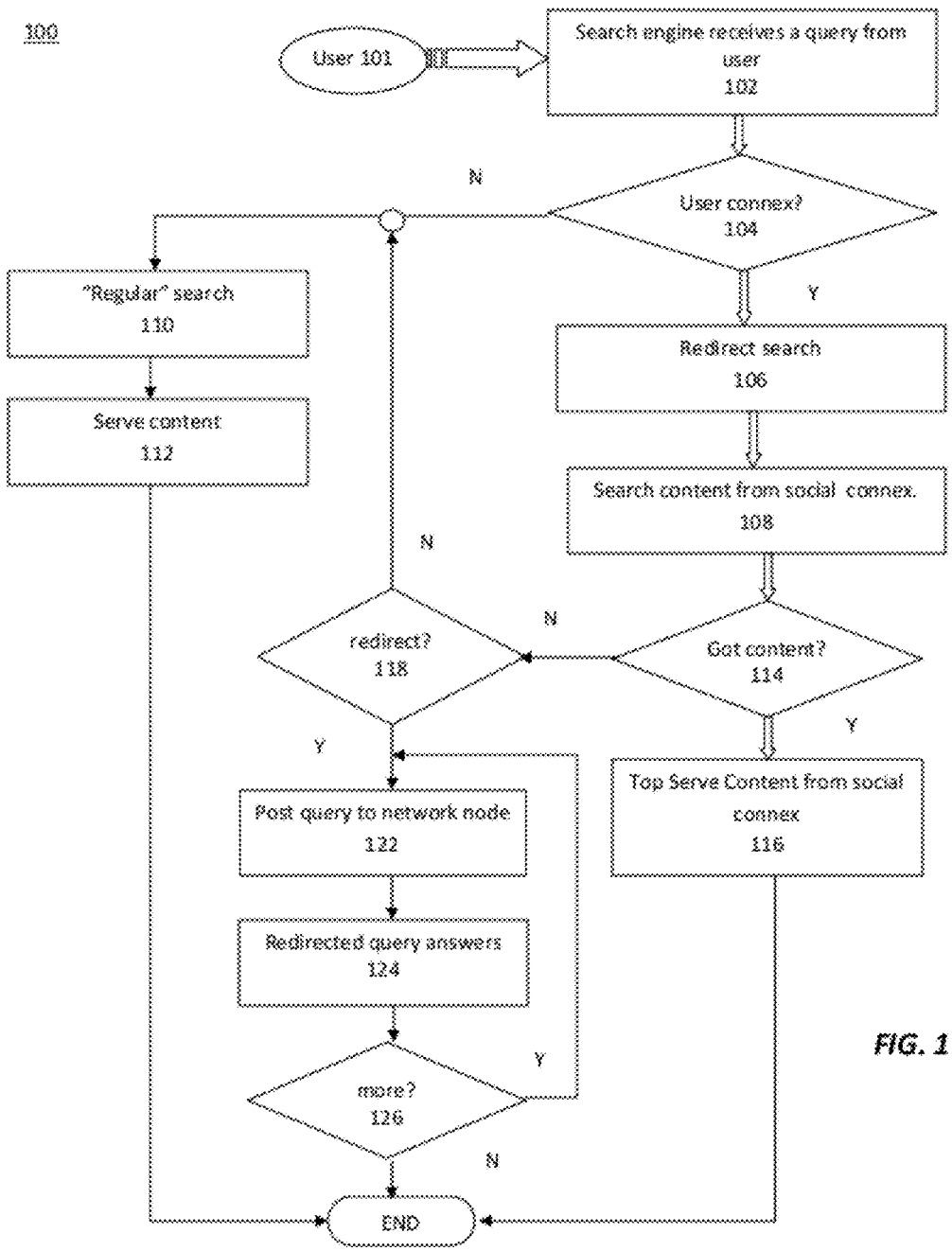
FIG. 1 is a flowchart of a method according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Figure 5:
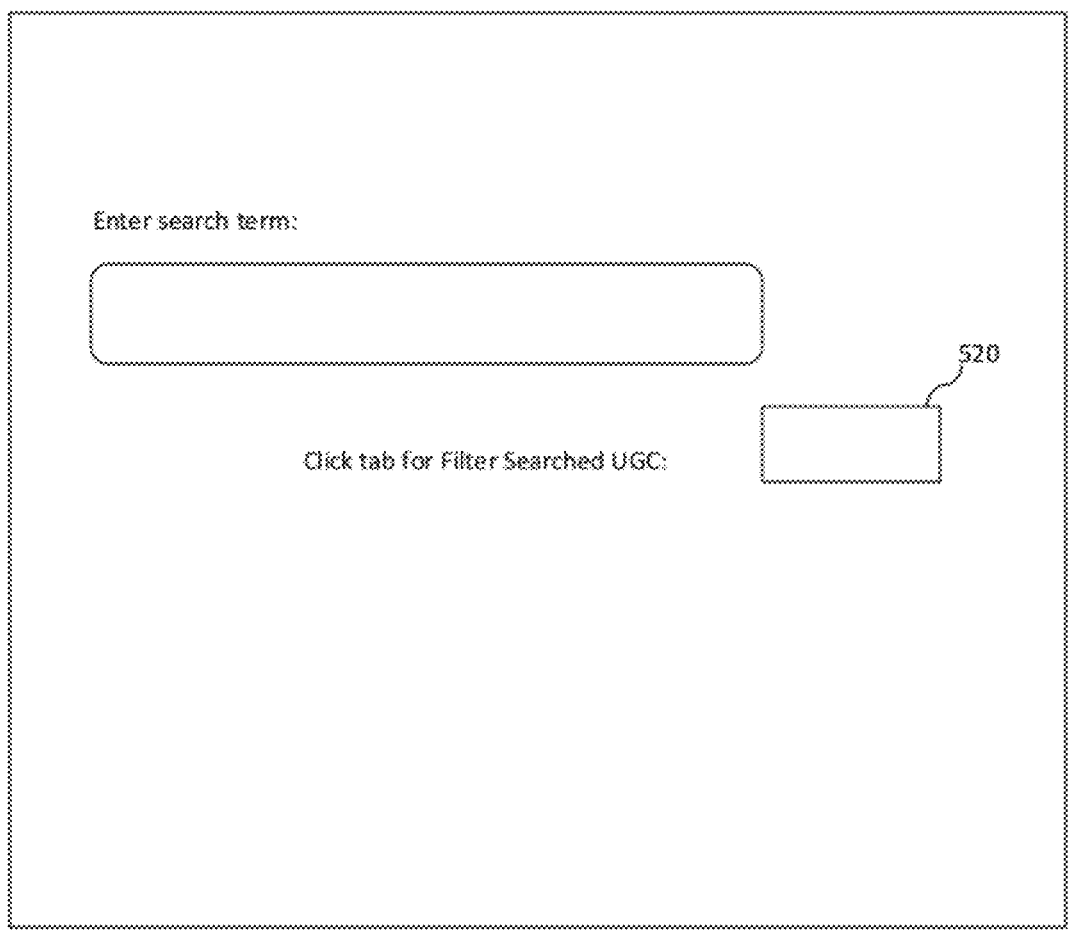
FIG. 5 is a simplified depiction of an exemplary search page, according to an embodiment of the present invention.

We discuss a system and method to serve reliable content spread across the Internet, the content contributed by the users themselves. We have more confidence of content reliability when content comes from a known person. Our solution is to give users UGC (user generated content) generated by their own connections. We apply this fact in search technology by serving Searched UGC filtered by a users' social connections/contacts. Referring now to FIG. 5, we supply a special tab 520 on a search page 510 to provide users with the option of searching content, sorted by the contributors, wherein the contributors are their own connections. These contributors can be social connections pulled from social networking sites such as Yahoo! Social Connections, Facebook, and Twitter, to name a few; and/or business connection pulled from sites such as Linked-in or corporate Local Area Networks (LAN). This way we are able serve more reliable information to the people, contributed by their known people.

Implementation.

This idea can be implemented using existing technologies and infrastructure. This search of reliable information is tedious if done manually. The user performing the search would need to type the content needed and the contributor name and the content top will be served when contributed by that additional name string. But the user would need to type all user connections while doing the search.

Our solution is to reformulate the search query by populating the user connection names/email ids into the search query to get the intended, more reliable, results. Apart from Yahoo! users, Facebook, MySpace, and Twitter-like partners can readily share user connections for this purpose. Other options include importing the connections/email-ids in CSV (comma-separated values) format, file, and manual option to type in non-Yahoo! connection details. In the description of this method we have limited the examples to one search engine (Yahoo! Search) for simplicity. It will be understood by those with knowledge in the art that the method as described herein can be advantageously employed with other search engines and search engine properties.

Implementing as Yahoo Application.

This invention can be implemented as a Yahoo! application, using YQL (Yahoo Query Language), Social APIs (Application Programmer Interface), and Yahoo! Search APIs. But connections import will be limited to Yahoo! and thus corresponding limited UGC search filtered on connections.

Possible issues include not many connections of any given user may have public UGC (user generated contributions). Until people contribute more content this implementation will have limited impact. But in a way, this is pushing for UGC contributions, across the web. A sense of own contributions being available to our connections on priority increases the contributor's interest.

Furthermore, there is a need to be more accessible for UGC contributions such as through Mobiles and developing apps which can quickly contribute UGC and have wider impact with this idea in place. Consider contributions from rural areas, which have good market potential when the Internet is easily accessible to them. Users may have contributing connections but not necessarily through Yahoo! websites or Yahoo! userid. We need to provide users with the ability to import their connections from whatever website they use to store their profile and connection details and source it to search engines such as Yahoo! search engine. The search engine will use the profile and connection details to filter a search by their connections, across websites, and across userids.

Content relevancy may initially decrease with this approach but will increase over time. When content is derived primarily from a user's connections, that content relevancy will depend on the number and type of people the user has as his/her connections. However, a contributor connection will assume more responsibility in providing more relevant information too; so with time, this relevancy—reliability gap will decrease. People have more confidence in the UGC from various source websites when content is from their known contacts. Users can cross-check and double-check the information, plus the users also can seek additional information quickly, if needed. Otherwise additional information gathering may require a further search or contacting an unknown contributor who may not respond quickly, as in a query from an unknown person.

Through this idea, it is possible to connect users with a new meaning Connecting and helping when actually needed provide more relevance, practically done by sharing experiences. Additionally, contributors receive a greater sense of responsibility of providing more reliable information, because the information they provide may get queried some time later by a known person. Plus helping a known person gives more recognition to a contributor. All these factors together result in more and more relevant contribution to websites worldwide and also an increase in user participation, such as in Yahoo!

Referring now to the drawings and to FIG. 1 in particular, there is shown a flow chart 100 illustrating a method according to an embodiment of the invention. In step 102 the search engine receives a query from a user 101. In step 104 it is determined if the query specifies a request for a search of content from user connections. This type of query can be requested by the user 101 clicking the tab 520. If there is no request to search from connections a regular search is performed in step 110.

If, however, the request specifies a search from connections then step 106 redirects the search to a URL for unified Yahoo! sites login (e.g. login.yahoo.com), which is required to pull in the user's social connections as performed in step 108. Yahoo! User's Social connections are mutually accepted contacts while the User's contacts in the address book are not necessarily social connections. A connect request is not necessarily honored by the contact.

After login, the user 101 is again re-directed to the same Yahoo! search engine from where the user 101 started and the original search query is executed with filters ON for user social connections. In step 114 a decision is then made on whether any content was received from connections. If there was content received from connections then in step 116, that content is served from the social connections.

If there is no content from social connections, in step 118 the user 101 requesting the search is prompted to determine whether to redirect the query to a list of social connections. If the prompt results in a further inquiry, then in step 122 the query is posted to a network node, which has access to the user's social connections, for example on a site such as 'locals.yahoo.com'. Then in step 124 the user 101 is provided with answers to the redirected query and in step 126 the user 101 is asked whether there are any more questions. If there are additional questions the process returns to step 122.

Figure 2:
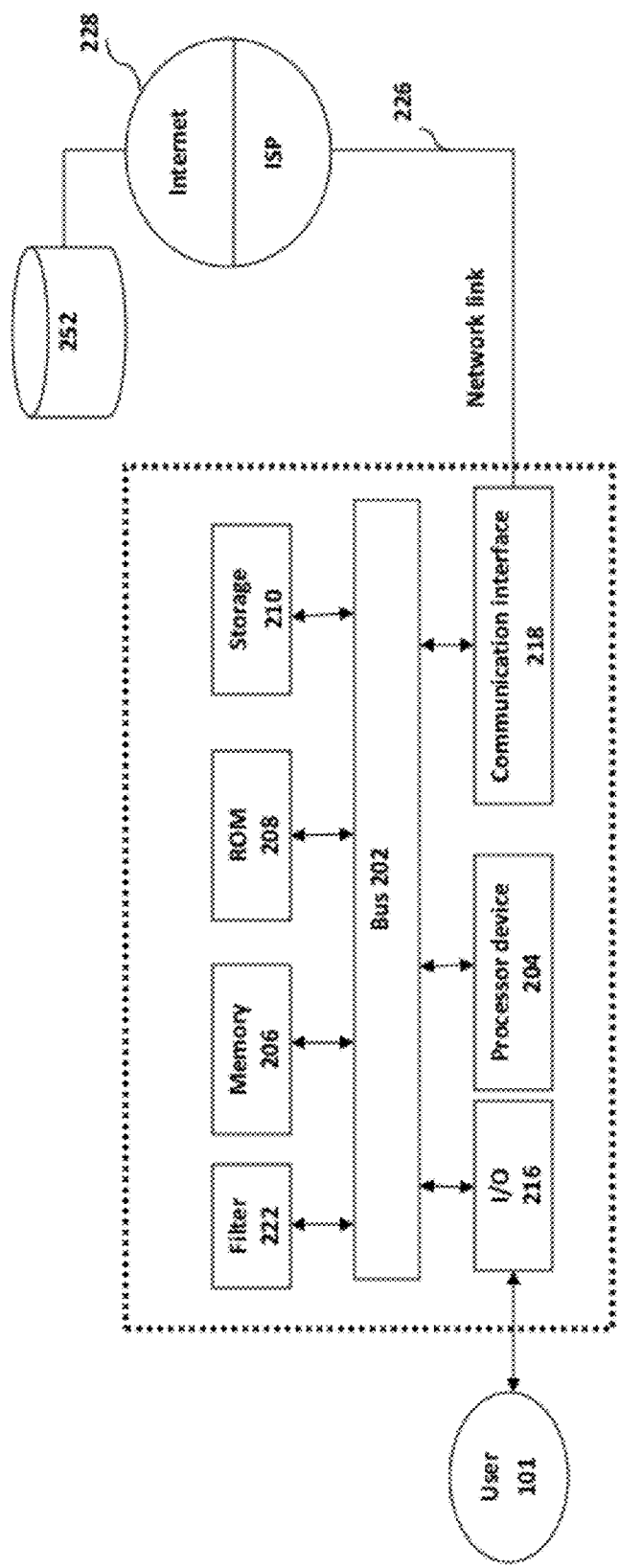
FIG. 2 is a high level block diagram showing an information processing system according to another embodiment of the invention.

Referring now to FIG. 2 there is shown a high-level block diagram illustrating an information processing system 200 upon which an embodiment of the present invention may be implemented. Computer system 200 includes a bus 202 or other communication mechanism for communicating information, and one or more processor devices, such as processor device 204 coupled with bus 202 for processing information. Note that system 200 can be a distributed system.

System 200 also includes a main memory 206, such as a random access memory (RAM) or other dynamic storage device, coupled with bus 202 for storing information and instructions to be executed by processor device 204. Main memory 206 also may be used for storing temporary variables or other intermediate information during execution of instructions to be executed by at least one processor such as processor device 204. System 200 further includes, inter alia, a read only (ROM) memory 208 or other static storage device, coupled with bus 202 for storing static information and instructions for processor device 202. A storage device 210, such as a magnetic disk or optical disk, is provided and coupled with bus 202 for storing information and instructions.

System 200 is in operative communication with user 101. User 101 enters a search query through known means. In an embodiment of the present invention, computer system 200 is used for implementing a search engine (or search engines) to produce optimized search results according to an embodiment of the present invention. According to one embodiment of the invention, the search results are optimized and provided by system 200 in response to processor device 204 executing one or more sequences of one or more instructions contained in memory 206. Filter 222 is operatively coupled with the processor device 204 for reformulating a search query to include user connections.

System 200 also includes a communication interface 218 providing a two-way communication coupling with a network link 226 to the Internet 228 or another search engine. Network link 226 typically provides data communication through one or more networks to other devices. Optionally, the system 200 is able to access data stores (represented by database 252) for retrieval and storing of information related to the invention.

FIG. 3 shows a simplified block diagram of implementation details. FIG. 4 is an exemplary listing of use cases.

Therefore, while there has been described what is presently considered to be the preferred embodiment, it will understood by those skilled in the art that other modifications can be made within the spirit of the invention. The above description of an embodiment is not intended to be exhaustive or limiting in scope. The embodiment, as described, were chosen in order to explain the principles of the invention, show its practical application, and enable those with ordinary skill in the art to understand how to make and use the invention. It should be understood that the invention is not limited to the embodiment) described above, but rather should be interpreted within the full meaning and scope of the appended claims.

I claim:

1. A method of serving reliable content in search, the method comprising:
 using an input/output interface, receiving a search query input by a user directed to a search engine and a selection of an option indicating a preference for user generated content contributed by contributors from social networking sites;
 using an information processing device, performing steps of:
 using a search filter, reformulating the received search query to include the user's social contacts in the reformulated search query;
 providing the reformulated search query to the search engine;
 obtaining a set of search results comprising search results including user-generated content corresponding the user's social contacts; and
 presenting the set of search results with an indication of greater reliability for the search results including user generated content corresponding the user's social contacts.

2. The method of claim 1 wherein, in response to the selection of the option, performing an initial step of:
 redirecting the search query to a network providing access to the user's social contacts.

3. The method of claim 2 further comprising:
 listing the user's social contacts accessible via the network; and
 returning to the search engine.

4. The method of claim 3 wherein the user's social contacts are located at a different network node from that of the user.

5. The method of claim 3 wherein the user's social contacts comprise another user's social contacts.

6. The method of claim 1 further comprising, after obtaining the set of search results:
 when it is determined that no user generated content was received from the user's social contacts, performing steps of:
 prompting the user to redirect the reformulated search query to a specific network with access to the user's social contacts; and
 posting the reformulated search query to the specific network.

7. The method of claim 1 further comprising performing a regular search if no user-generated content is found in response to the search query.

8. The method of claim 1 wherein providing the indication of greater reliability comprises prioritizing display of search results that contain the user generated content from the user's social contacts.

9. An information processing system for serving reliable content in search, comprising:
 an input/output interface;
 a processor device; and
 a memory with computer-executable instructions executed by the processor device to:
 receive a search query input by a user directed to a search engine and a selection of an option indicating a preference for user generated content contributed by contributors from social networking sites;
 reformulate the received search query to include the user's social contacts in the reformulated search query;
 provide the reformulated search query to the search engine;
 obtain a set of search results comprising search results including user-generated content corresponding the user's social contacts; and
 present the obtained set of search results with an indication of greater reliability for the search results including user generated content corresponding the user's social contacts.

10. The information processing system of claim 9 further comprising computer-executable instructions to:
 redirect the search query to a network providing access to the user's social contacts in response to the selection of the option.

11. The information processing system of claim 10 further comprising computer-executable instructions to:
 list the user's social contacts accessible via the network; and
 return to the search engine.

12. The information processing system of claim 11 wherein the social contacts comprise another user's social contacts.

13. The information processing system of claim 9, further comprising computer-executable instructions to, after obtaining the set of search results:
 prompt the user to redirect the reformulated search query to a specific network with access to the user's social contacts when it is determined that no user generated content was received from the user's social contacts; and
 post the reformulated search query to the specific network.

14. The information processing system of claim 9 wherein providing the indication of greater reliability comprises prioritizing display of search results that correspond to the user's social contacts.

15. A computer program product comprising a tangible storage medium with computer-executed instructions for serving reliable content in search stored thereon, said computer-executable instructions executed by at least one processor to perform steps comprising:
 receiving a search query input by a user directed to a search engine and a selection of an option indicating a preference for user generated content contributed by contributors from social networking sites;
 reformulating the received search query to include the user's social contacts in the reformulated search query;
 providing the reformulated search query to the search engine;
 obtaining a set of search results comprising search results including user-generated content corresponding the user's social contacts; and
 presenting the obtained set of search results with an indication of greater reliability for the search results including user generated content corresponding the user's social contacts.

16. The computer program product of claim 15 wherein, the search query is redirected to a network providing access to the user's social contacts in response to the selection of the option.

17. The computer program product of claim 16, wherein computer-executable instructions executed by at least one processor to perform:
    listing the user's social contacts accessible via the network; and
    returning to the search engine.

18. The computer program product of claim 17 wherein the user's social contacts comprise another user's social contacts.

19. The computer program product of claim 15, wherein computer-executable instructions executed by at least one processor to perform, after obtaining the set of search results:
    prompting the user to redirect the reformulated search query to a specific network with access to the user's social contacts when it is determined that no user generated content was received from the user's social contacts; and
    posting the reformulated search query to the specific network.

20. The computer program product of claim 15 wherein providing the indication of greater reliability comprises prioritizing display of search results that correspond to the entities from the user's social contacts.

\* \* \* \* \*